Dec. 13, 1966 W. C. WATSON 3,291,676

TILE SHEET-BACKING APPARATUS

Filed Dec. 20, 1962 6 Sheets-Sheet 1

INVENTOR:
WAYNE C. WATSON
BY Howson & Howson
ATTYS.

INVENTOR:
WAYNE C. WATSON
BY
Howson & Howson
ATTYS.

TILE SHEET-BACKING APPARATUS

Filed Dec. 20, 1962

INVENTOR
WAYNE C. WATSON
BY Howson & Howson
ATTYS.

Dec. 13, 1966 W. C. WATSON 3,291,676

TILE SHEET-BACKING APPARATUS

Filed Dec. 20, 1962 6 Sheets-Sheet 4

INVENTOR:
WAYNE C. WATSON

BY Howson & Howson

ATTYS.

INVENTOR
WAYNE C. WATSON
BY Howson & Howson
ATTYS

TILE SHEET-BACKING APPARATUS

Filed Dec. 20, 1962 6 Sheets-Sheet 6

INVENTOR
WAYNE C. WATSON
BY Howson & Howson
ATTYS.

3,291,676
Patented Dec. 13, 1966

3,291,676

TILE SHEET-BACKING APPARATUS

Wayne C. Watson, Ambler, Pa., assignor to American Olean Tile Company, Inc., Lansdale, Pa., a corporation of New York Filed Dec. 20, 1962, Ser. No. 246,124
13 Claims. (Cl. 156—561)

This invention relates to tile sheet-backing apparatus, more specifically to apparatus for arranging a layer of tiles accurately in the pockets of a partitioned board or tray in preparation for the application thereto of a layer-retaining backing sheet and for turning the boards to present them to a drying oven after the backing sheet has been applied.

The present apparatus is intended to be associated with preparatory apparatus which assembles tiles in the pockets of a partitioned tray or board in a general tile-packaging process which includes the steps of providing a layer or sheet of tiles and securing them in position by an adherent backing sheet, as of paper, for subsequent use in tile setting operations. The system of packing tiles in sheets to be laid in cement and the adherent paper backing subsequently soaked off is well known and has been in common use for a long time. The packaged sheets of tiles may, for example, consist of twelve (12) longitudinal rows and twenty-four (24) transverse rows, giving a total of two hundred and eighty-eight (288) tiles to a sheet package.

The tiles may be assembled in the pockets of the boards or trays in various ways, the simplest way, of course, being to insert them by hand. However assembled, the present invention presupposes that boards full of tiles are received at fixed spaced intervals on a chain belt conveyor with the top surface of the tiles clean enough to have the adhesive coated backing layer bonded thereto.

One form of apparatus for assembling tiles in the pockets of pattern boards is disclosed in U.S. Patent 3,177,568, issued April 13, 1965.

The pockets of the tile holding boards are larger than the tiles, both longitudinally and transversely, and purposely so in order that the tiles can be easily inserted. The loose or free side space in the pockets together with the thickness of the partitions forming the pockets of the boards eventually provides the correct space between tiles to receive cement grouting after the paper backing has been soaked and scrubbed off subsequent to laying the sheet of tiles in a bed of cement on the floor or wall.

While the boards are received with a tile in each pocket, the tiles may not be disposed alike in every pocket. Some or all of them may be askew in the pockets. They should all be arranged alike if uniform grout lines are to appear in the final tiled surface. The present invention provides means for arranging all tiles in precisely the same way in all board pockets ready to receive the backing sheet.

The invention also provides means for turning the boards after the backing sheet has been applied so as to present boards sidewise, i.e. with the longer dimension arranged transversely, to a drying oven whereby to allow a shorter oven to be used than would be possible if the boards were fed in endwise.

In order to provide a better understanding of the invention, its objects, features of novelty, and advantages, an exemplary embodiment will be described for purposes of illustration, reference being made to the accompanying drawings thereof, wherein.

Figures 1, 2, 3, 3A, 3B, 3C, 3D:
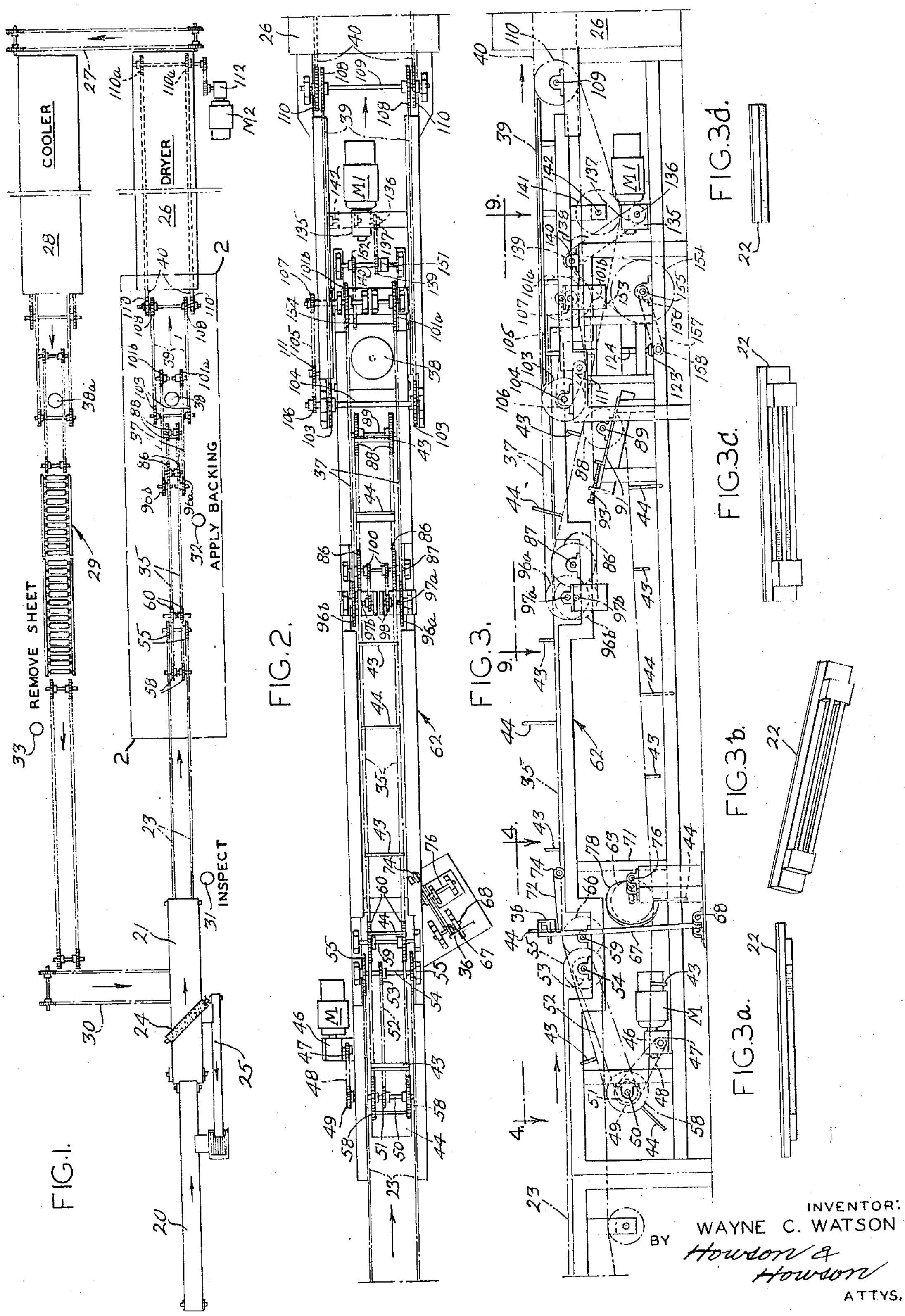
FIG. 1 is a top plan view, diagrammatic in nature, of tile sheeting apparatus embodying the present invention.
FIG. 2 is an enlarged plan view of apparatus shown in the zone 2—2 of FIG. 1.
FIG. 3 is a side elevation of the apparatus shown in FIG. 2.
Figures 4, 5:
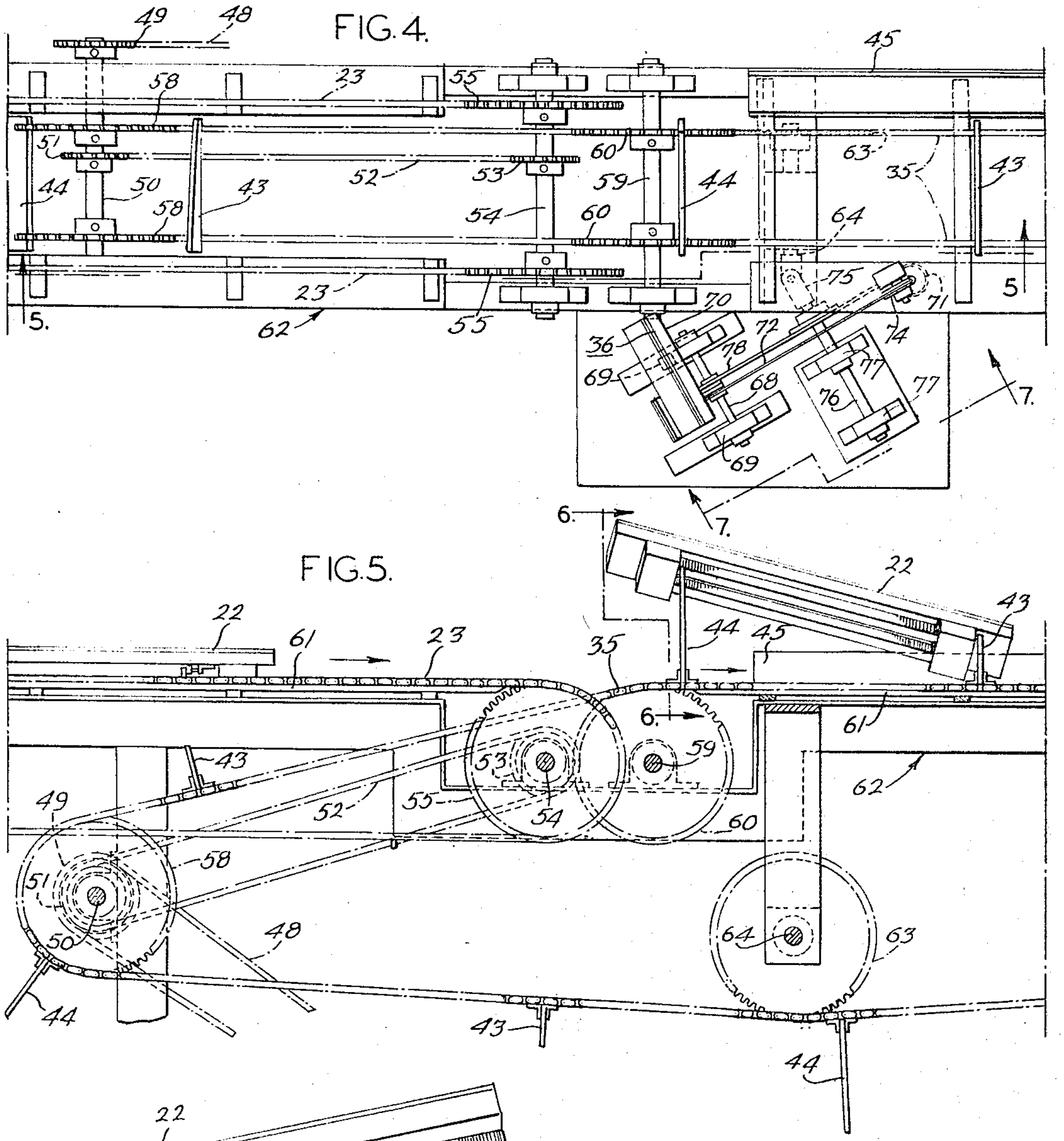
Figure 6:
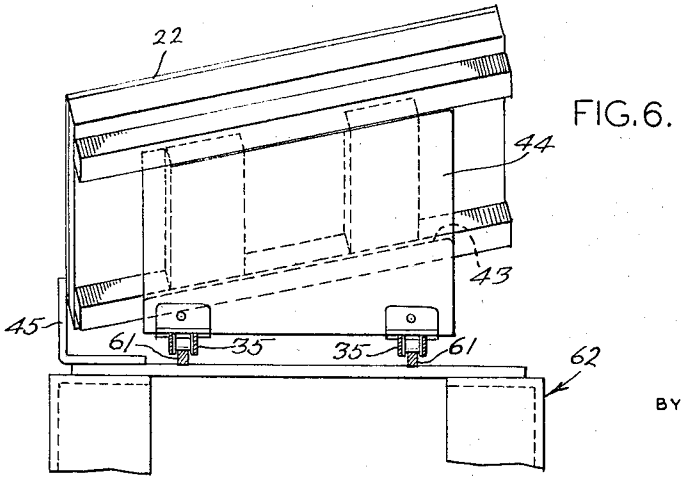
Figures 7, 8, 8A:
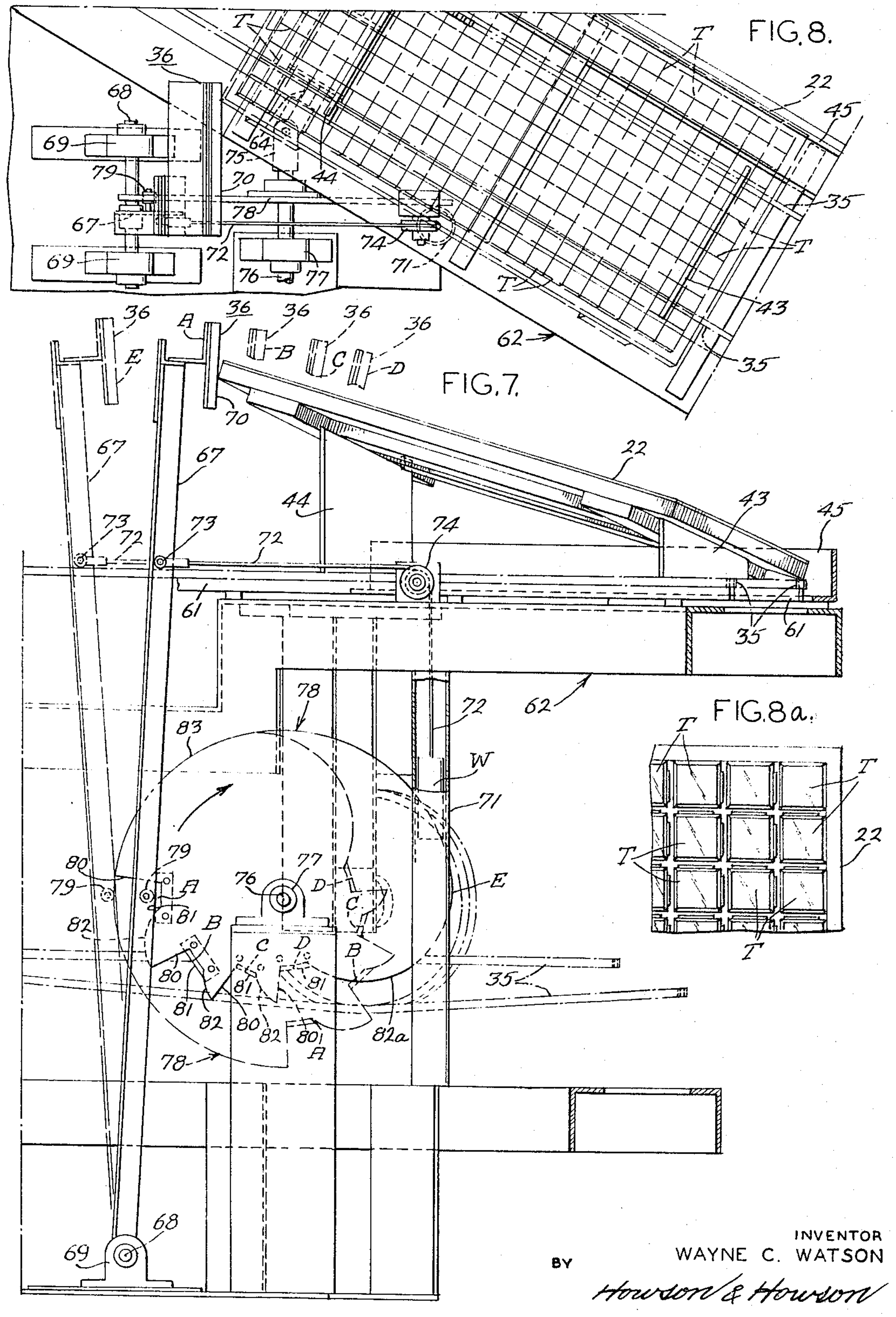
Figure 9:
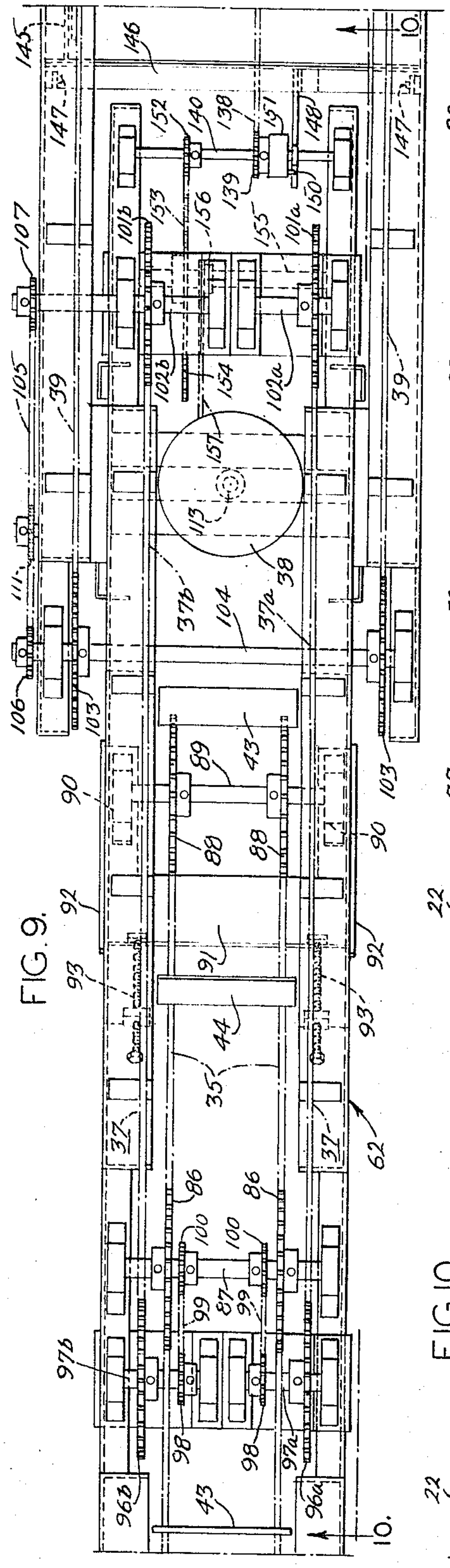
Figures 10, 10A:
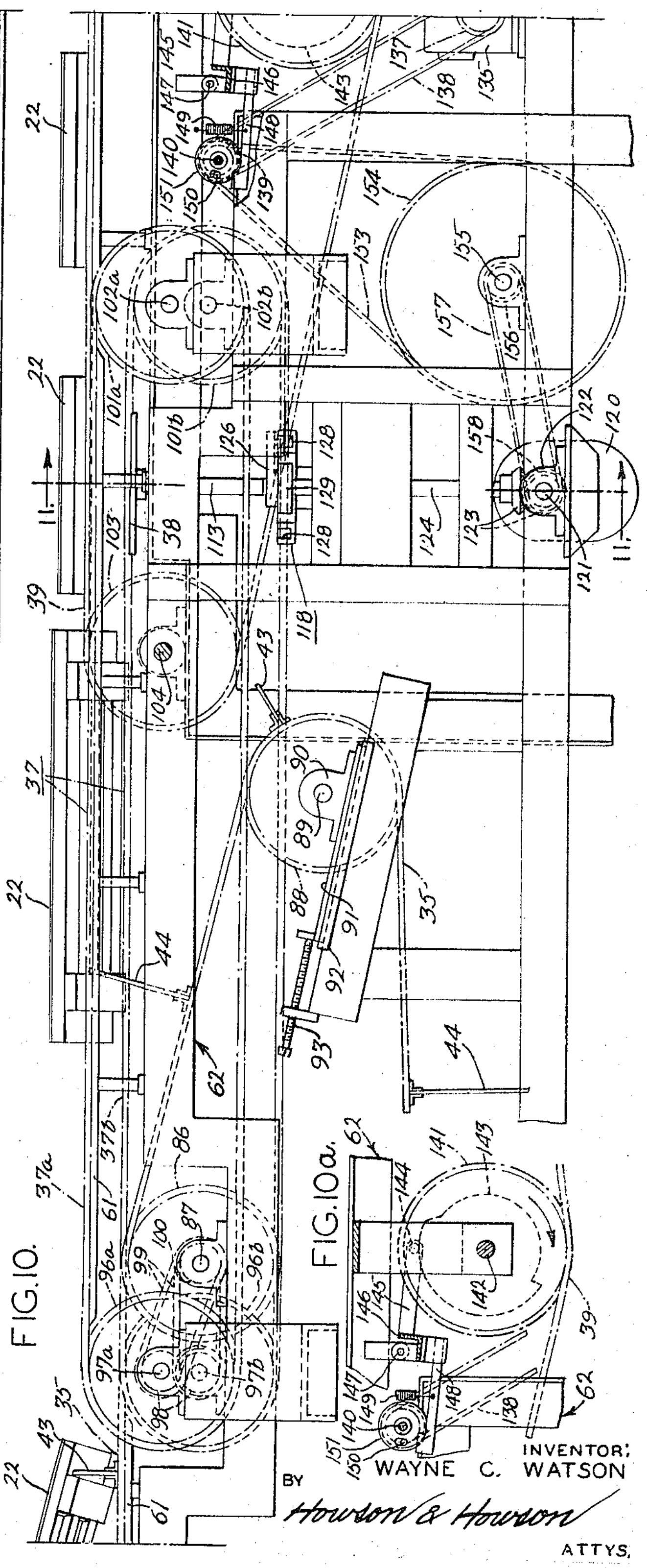
Figure 11:
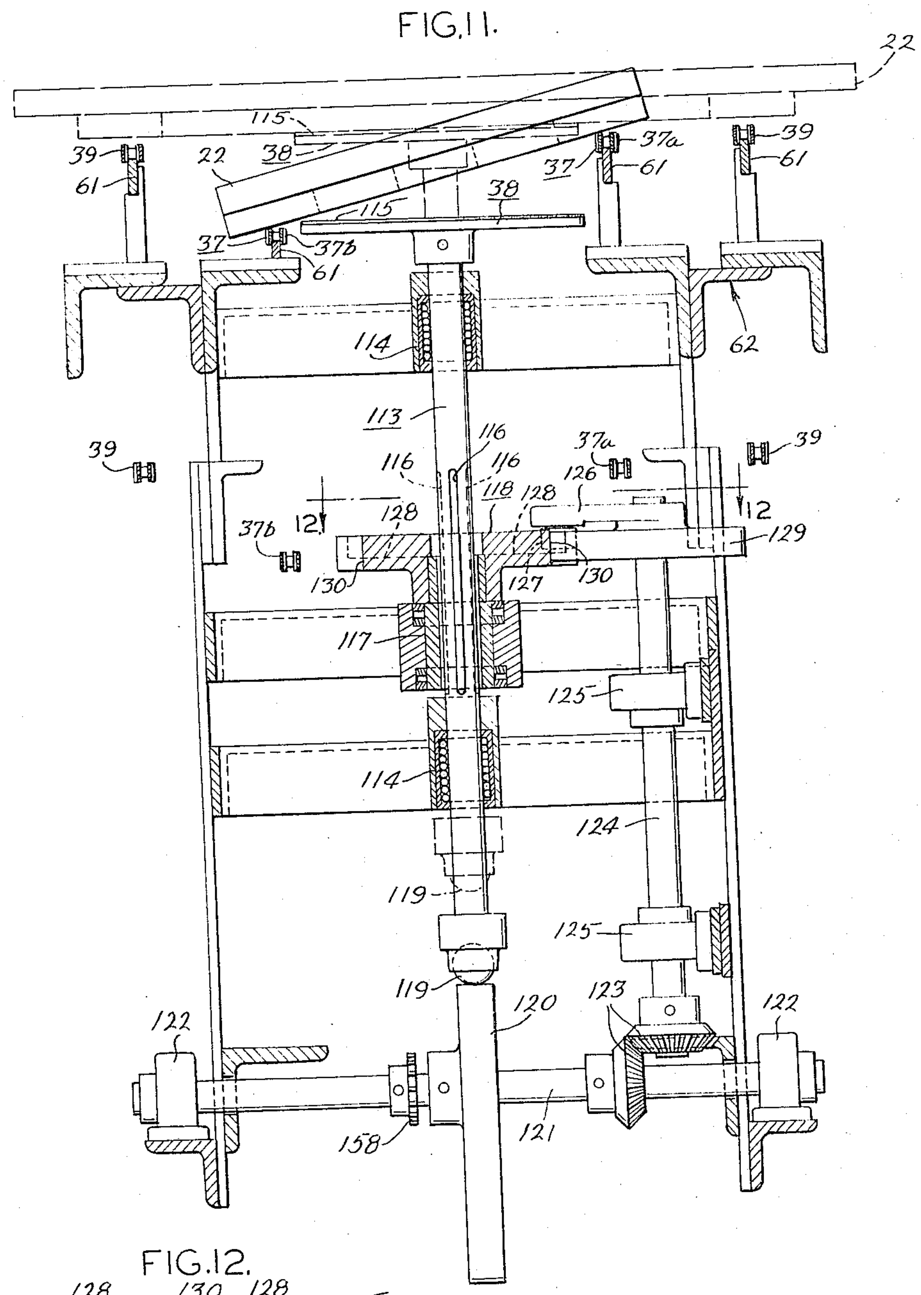
Figure 12:
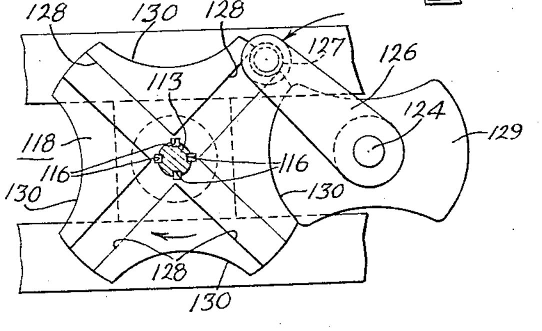
Figures 13, 14:
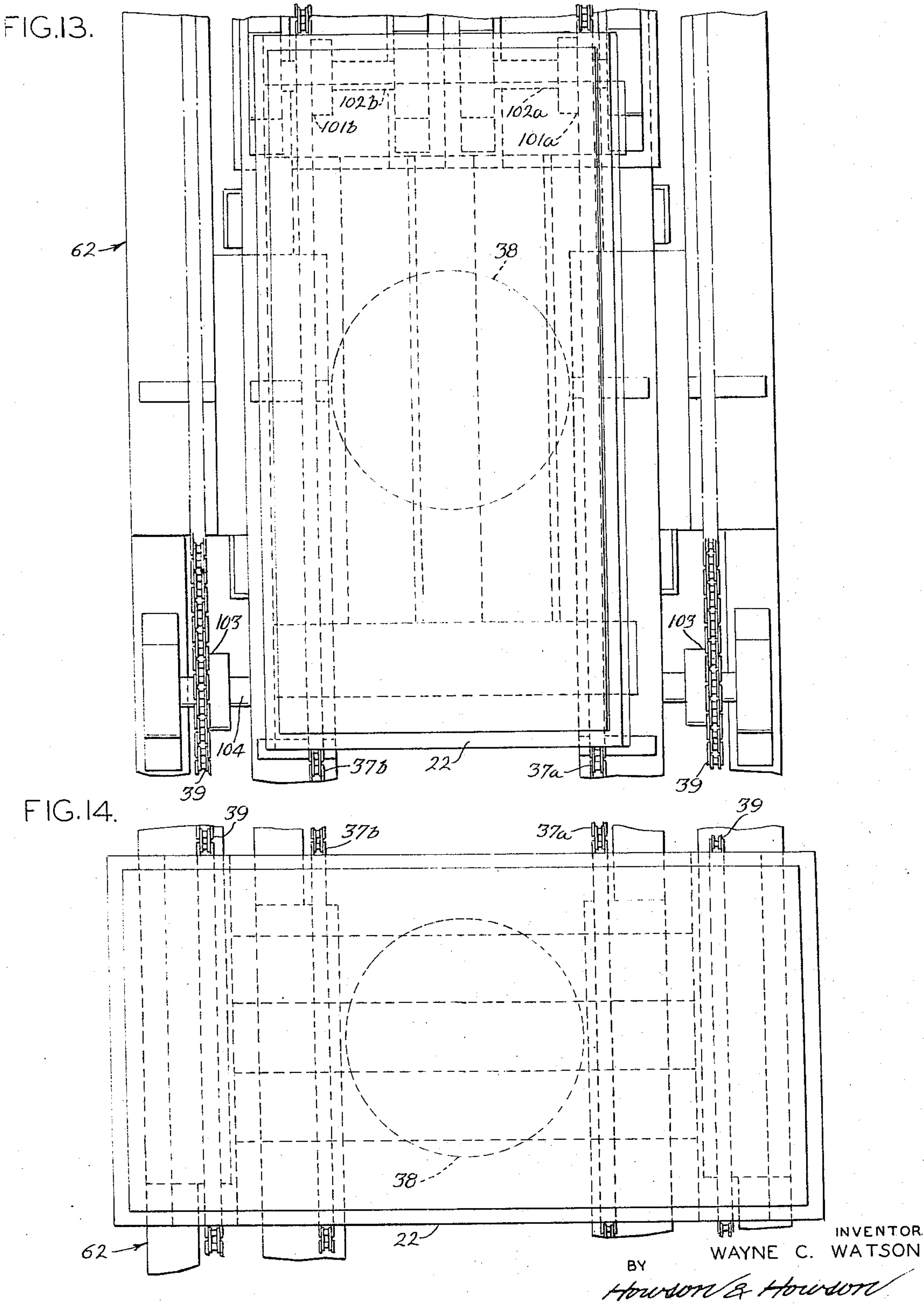

FIG. 3*a* is a side view of a tile board to show its disposition at a point directly thereabove in FIGS. 2 and 3;

FIG. 3*b* is a side view of a tile board to show its disposition at a point directly thereabove in FIGS. 2 and 3;

FIG. 3*c* is a side view of a tile board to show its disposition at a point directly thereabove in FIGS. 2 and 3;

FIG. 3*d* is a side view of a tile board to show its disposition at a point directly thereabove in FIGS. 2 and 3;

FIG. 4 is an enlarged plan view taken on the line 4—4 of FIG. 3;

FIG. 5 is a side elevation and section taken on the line 5—5 of FIG. 4;

FIG. 6 is a transverse section and elevation taken on the line 6—6 of FIG. 5;

FIG. 7 is an enlarged side elevation taken on the line 7—7 of FIG. 4;

FIG. 8 is a top plan view of parts shown in FIG. 7;

FIG. 8*a* is an enlarged fragmentary plan view of the low corner of the board of FIG. 8 to show how the tiles have been arranged in the board pockets;

FIG. 9 is an enlarged plan view taken on the line 9—9 of FIG. 3;

FIG. 10 is a side elevation and section taken on the line 10—10 of FIG. 9;

FIG. 10*a* is a partial side elevation and section of parts shown at the right side of FIG. 10 and slightly beyond;

FIG. 11 is an enlarged transverse section taken on the line 11—11 of FIG. 10;

FIG. 12 is a partial horizontal section taken on the line 12—12 of FIG. 11;

FIG. 13 is an enlarged plan view of the turntable and related parts shown in FIG. 11 with the tile board in its position before turning; and FIG. 14 is a view like FIG. 13 showing the board after turning.

Referring to FIG. 1, there is shown a comprehensive plant layout for packaging tiles in sheets. At the left a belt conveyor 20 feeds random loose tiles T (see FIG. 8*a*) to an orienting and assembling device 21 which arranges the tiles in longitudinal rows and deposits them in the pockets of tile-holding trays or boards 22 which are moved along continuously at spaced intervals on a chain conveyor 23. A diagonal rotary brush 24 sweeps off excess tiles to a tile return conveyor 25 which delivers them back to the feed conveyor 20.

Boards are deposited on the chain conveyor 23 from the side and beneath the orienting and assembling device 21 so as to be moved forwardly continuously on the conveyor for tiles to be deposited therein. This much of the plant is specifically disclosed in the copending application referred to above.

If it is desired to deposit specific controlled patterns of different types of tiles in the board pockets, the conveyor line 23 may have associated with it some other type of tile arranging means instead of that indicated herein. In any event, it will be assumed that boards filled with tiles are advanced by the belt 23; also that the top surfaces of the tiles have been cleaned ready for the application thereto of the adhesive-coated backing sheet.

However, since the pockets are larger than the tiles, the tiles will occupy random locations in the pockets and before the backing sheet is applied they need to be arranged alike or uniformly in the pockets. This is done in the zone 2—2 and the apparatus in this zone forms part of the subject matter of the present invention.

Still referring to FIG. 1, there is shown beyond the zone 2—2 a drying oven 26, a cross conveyor 27, a cooling chamber 28, a return conveyor line 29, and a cross-feed return conveyor 30 for re-depositing empty tile boards 22 on the conveyor chain 23. This board return apparatus forms the subject matter of another application of the present applicant and need not be further disclosed herein.

The operations are all largely automatic but it is contemplated that three operators will be employed, one at an inspection station 31 to see that all boards are filled and in proper order, one at a backing sheet-applying station 32 to apply adhesive-coated backing sheets to the tiles, and one at a delivery station 33 to remove the finished backed tile sheets or packages.

Coming now to the present invention and referring to FIGS. 2 and 3, the tile boards 22 (filled with tiles) are taken from the chain conveyor 23 by a board-tilting conveyor 35 which tilts the boards in two directions or about two axes, longitudinally and transversely, with one corner disposed lowermost and one corner uppermost. The boards, while thus tilted and still moving forward continuously, are struck repeatedly on the high corner by a rapping device 36 to cause all tiles to move down into the lower corners of their pockets. A few of these precisely arranged tiles are shown in FIG. 8*a*.

After the tiles have been precisely arranged by rapping, the boards have the backing sheet applied at station 32 and are then transferred from the double-tilt conveyor 35 to a side-tilt conveyor 37 which carries the boards to a turntable 38. The boards are still moving endwise at a continuous uniform rate of travel speed.

The turntable 38 first elevates a board, then turns it horizontally through an angle of ninety degrees (90°), and finally lowers it upon a higher wide horizontal chain conveyor 39. The conveyor 39 transfers the boards sidewise to means supporting them for travel through the drying oven 26, for example rails or a chain conveyor 40.

FIG. 3*a* shows the disposition of a board as it travels endwise on the conveyor 23. FIG. 3*b* shows a board on the conveyor 35 after it has been tilted toward a leading end corner at one side. FIG. 3*c* shows a board on the side-tilted conveyor 37. And FIG. 3*d* shows a board as it travels sidewise and horizontally on the conveyor 39.

The conveyor 35 tilts and supports boards by pairs of projections 43 and 44 of different height and with inclined top surfaces, as best shown in FIGS. 5 and 6. These supports are equivalent to four posts of different height but serve better as plates. The high rear projections 44 engage batten elements beneath the board to prevent forward and transverse sliding of the board and the front projections 43 likewise are arranged to prevent forward and transverse sliding movement of the board. To assist in preventing side sliding movement, the supporting frame is provided with a side guide rail 45.

The conveyors 23, 35, 37 and 39 are driven (FIGS. 2 and 3) by a prime mover, such as a motor M with a gear box 46. The gear box has a shaft sprocket 47 which drives a chain 48 which, in turn, drives a sprocket 49 on a transverse shaft 50. The shaft 50 has a sprocket 51 which drives a chain 52 which, in turn, drives a sprocket 53 on a transverse shaft 54. The shaft 54 has sprockets 55 which drive the two spaced chain belts of the chain conveyor 23.

The shaft 50 has spaced sprockets 58 which drive the chains of the board-tilting chain conveyor 35. Referring to FIGS. 4 and 5, there is arranged at a considerable distance forward and above the shaft 50 a transverse shaft 59 carrying sprockets 60 which support the chains of the chain conveyor 35. This arrangement causes the supporting projections 43 and 44 to rise beneath the tile boards and lift them up off the conveyor 23 and in properly tilted position. Since the overlapping portions of conveyors 23 and 35 travel at about the same effective speed the transfer of the boards will be smoothly accomplished. Actually, because of its angular upward approach, the conveyor 35 travels at a higher linear speed than conveyor 23 (say 2.9 to 2.5 in. per sec.) so that the effective horizontal speeds in the overlapping portions will be the same. The horizontal surface speed of the conveyor 35 is enough faster than that of conveyor 23 so that the boards on conveyor 35 are spaced further apart on conveyor 35 than on conveyor 23 (say 10″ to 5″), which gives the operator more space for applying backing sheets to the tiles on the boards. The chains of the conveyors travel on longitudinal supporting rails 61 of the main frame 62 which properly support and guide them.

On the lower reach or span the chains of the conveyor 35 at least one of the chains passes over a sprocket 63 of a rapper operating shaft 64 and thereby drives the shaft.

FIGS. 8 and 9 shows the rapper mechanism. The rapper 36 which strikes the high corner of a board several times in passing has already been mentioned. It comprises a wide bar supported on the upper end of an upright support arm 67 swingably carried on a shaft 68 mounted in floor supported bearings 69. The rapper bar may be covered on the striker side by resilient material 70 such as rubber. The support 67 is yieldably urged in a forward direction at the upper end by a weight W movable in a tube 71 and connected to the support 67 by a cable 72 at a pin 73, the cable passing over a sheave 74.

The driven shaft 64 is connected by an angle drive device, such as a flexible coupling 75, to a rapper shaft 76 supported in bearings 77 carried by the main frame. On the shaft 76 there is secured a notched rapper disk or ratchet 78 adapted to cooperate with a follower roller 79 carried on a pin on the support 67. The disk 78 is provided with a plurality of radial drop-off notches 80, stop surfaces 81, and cam risers 82 of graduated radial height whereby the rapper is caused to oscillate to strike the board and at the same time to follow the board as it moves forward. The bottom stop elements 81 may comprise removable insert plates of any suitable character, such as rubber, to engage the roller 79 after the rapper 36 has engaged the board and the board has moved forward. The different striking positions are indicated by the letter A, B, C and D in FIG. 7 and the respective cam notches are indicated by the same letters. Finally, the disk has a long cam riser **82*a* leading to an outer concentric surface 83. The off position of the rapper in FIG. 7 is indicated by the letter E and the point where the cam surface 82*a* joins the outer concentric surface 83 of the disk is also indicated by the letter E. The outer concentric surface 83 is of sufficient length to take account of the distance between boards on the conveyor plus the length of a board, so that rapping begins just as the rear end of a board passes the rapper. The broken lines in FIG. 7 indicate the position of the disk 78** just after the completion of the rapping action.

Referring to FIGS. 9 and 10, the chains of the double tilting conveyor 35 pass over sprockets 86 of a transverse shaft 87 and then gradually drop down to pass over sprockets 88 of a shaft 89 mounted in bearings 90 of a sliding frame 91 which is adjustable in a guide support 92, as by screws 93, to adjust the tension in the conveyor.

As stated before, the conveyor 37 is inclined to one side, meaning that one of the chains, as **37*a*, is higher than the other chain 37*b*. At each end the chains 37*a*, 37*b* are mounted on shafts at different levels, the chain 37*a* at the left end being carried by a sprocket 96*a* on a high shaft 97*a* and the chain 37*b* being carried by a sprocket 96*b* on a low shaft 97*b*. The shafts 97*a*, 97*b* each carry a sprocket 98 engaged by a chain 99 driven by a sprocket 100 on the shaft 87**.

At the other end the chains **37*a* and 37*b* respectively are carried by sprockets 101*a*, 101*b* of high shaft 102*a* and low shaft 102*b*** respectively.

The chains of the conveyor 39 are carried at one end by sprockets 103 of a transverse shaft 104. The shaft 104 is driven from shaft **102*b* through a chain 105 and sprockets 106 and 107 on the shafts 104 and 102*b* respectively. An adjustable idler sprocket 111 keeps the chain 105 tight. At the forward end (FIGS. 2 and 3) the chains of conveyor 39 are carried by sprockets 108 on a shaft 109. The shaft 109 turnably supports thereon sprockets 110 for supporting the chains of conveyor 40. The conveyor 40 is driven by any suitable means, such as a motor M2, gear box 112 and chain and sprocket connections to the shaft carrying outer sprockets 110***a* of the conveyor. The conveyor 40 travels at about half the speed of the conveyor 39 so that the boards are disposed closely together and travel at slow speed through the oven.

It has been explained that there is a considerable length of overlap between conveyors 35 and 23 with a rising span of conveyor 35 for lifting boards off conveyor 23 and holding them up on a double angle for rapping; also that there is a considerable length of overlap between conveyors 35 and 37 with a dropping span of conveyor 35 for depositing boards on the side sloping conveyor 37. The side slope of conveyor 37 is the same as the side slope of the conveyor 35 so that the boards are not shaken by sudden movement during the transfer. At this time the adherent backing sheet has been applied but the adhesive has not been dried and there is still danger of tile dislodgement.

The board turning mechanism is shown in FIGS. 9 to 14. As best shown in FIG. 11, the turntable 38 is mounted on the upper end of a rotatable and vertically slidable shaft 113 supported in bearings 114 carried by the main frame 62. The turntable rises just as the middle of a board 22 is centered over it and the turntable plate is covered with neoprene or the like 115 which is adapted to frictionally engage the under side of the board on the low side where first engaged. The shaft 113 has a splined portion 116 slidable in the hub sleeve 117 of a rotatable nonslidable Geneva gear 118.

The lower end of the turntable shaft 113 is provided with a rotary cam follower ball 119 which rides on the outer surface of a lift cam 120 mounted on a transverse shaft 121 supported in bearings 122. Through bevel gears 123, 123 the shaft 121 drives a vertical Geneva drive shaft 124 mounted in bearings 125 and at its upper end carrying a Geneva drive arm 126 with drive pin 127 to engage the slots 128 of the Geneva gear 118 and also carrying a lobed holding and release disk 129 adapted to engage in arcuate recesses 130 of the gear 118.

Referring to FIGS. 2 and 3, the turntable mechanism is operated by a motor M1 having a gear box 135 with a shaft 136 driving a sprocket 137. Through a chain 138 the sprocket 137 drives the sprocket 139 of a clutch shaft 140. The lower span of the chain of conveyor 39 engages the sprocket 141 of a shaft 142 to drive it continuously.

The shaft 142 carries a cam 143 which turns in the direction indicated in FIG. 10*a* and a cam follower roller 144 carried by an arm 145 rides on the cam. The arm 145 is carried by a hinged member 146 which turns about pivot means 147 on the main frame. The member 146 carries another arm 148 which is urged upward by a spring 149 and which has its end disposed where it will, when allowed by the cam to be moved upward by the spring 149, engage the pin 150 of a clutch 151 to cause the shaft 140 to turn.

The shaft 140 carries a sprocket 152 which drives a chain 153 which, in turn, drives a much larger sprocket 154 of a lay shaft 155. The shaft 155 carries a relatively small sprocket 156 which drives a chain 157 which, in turn, drives a sprocket 158 on the turntable lifting and turning shaft 121 previously noted.

The arrangement is so organized and timed that each time a board arrives in central position above the turntable the shaft and its turntable disk will be pushed up to carry the board above the level of both conveyors 37 and 39, then turn it a quarter turn or 90°, and finally to lower it down on the wide high-level conveyor 39 which then carries it sidewise toward the drying oven.

The operation of the apparatus as a whole will be clear from the foregoing description. Boards with tiles in all pockets but in random positions move along the conveyor 23 until they are picked up and tilted toward a low corner on the conveyor 35. The boards are rapped several times as they pass the rapping mechanism to cause all of the tiles to move into the lower corner of their pockets. The operator then applies an adherent backing sheet to the tops of the tiles after being accurately rear-ranged. The pocket-forming partitions of the boards are not as deep as the tile thickness so that the backing sheet will not engage the partitions.

The boards are transferred from the double-tilt conveyor 35 to the single-tilt conveyor 37 and when in proper position therealong are lifted by the turntable, turned by a right angle and are lowered upon the wide-track high-level conveyor 39 to be forwarded sidewise to the heating oven. From there they travel by the cross conveyor 27 to the cooling chamber 28. From this they advance along the return conveyor line 29. They are turned through 90° at a turntable 38*a* for further movement in endwise travel. As they pass the delivery station 33 the backed sheets of tiles are lifted from the boards and the empty boards continue their travel along the conveyor line 29 until they come to the crossover return line 30 where they are picked up and returned to the conveyor 23 for refilling.

It is thus seen that the invention provides very convenient and efficient means for precisely positioning tiles in assembly board pockets and turning the boards sidewise for advancing through a drying oven.

While one embodiment of the invention has been described for purposes of illustration it is to be understood that there may be various embodiments and modifications within the general scope of the invention.

I claim:

1. Tile sheet backing apparatus, comprising in combination, a board forwarding first conveyor which moves rectangular tile boards, having tile-holding pockets thereon, endwise and spaced apart along a horizontal path at a continuous uniform speed,
   - a double-tilt second conveyor having board supports which hold a board with one corner lowermost for taking tile boards from said first conveyor and moving them along continuously,
   - means alongside said second conveyor for agitating the boards to cause tiles to shift in their pockets to limiting positions toward the lowermost corner of said board where they are retained by gravity for the application of an adhesive backing sheet to the tiles on a board,
   - said agitating means including a member timed to move forward for a distance with an advancing board as it agitates the board,
   - a side-tilt third conveyor which takes boards endwise with one side lowermost and moves them continuously from said second conveyor,
   - a high-level wide-gage fourth conveyor overlapping said third conveyor arranged to hold boards sidewise and move them along continuously,
   - a board turning device arranged in the overlap of said third and fourth conveyors which is constructed and arranged to lift boards from said third conveyor to a level above said fourth conveyor, turn them ninety degrees, and lower them sidewise-forward on said fourth conveyor,
   - a drying oven to receive boards travelling sidewise,
   - and a separately driven more slowly moving fifth conveyor travelling with boards arranged sidewise for taking boards from said fourth conveyor and moving them with closer spacing through said oven.

2. Tile sheet backing apparatus comprising in combination, first conveyor means for continuously moving rectangular tile boards with pockets having tiles therein, said tile boards being advanced on said conveyor means in a spaced apart, endwise manner, means along said conveyor means including a double-tilt conveyor for rearranging the tiles in a precise uniform position in the pockets of the board for application of an adhesive-held backing sheet to the tiles, a heating oven for drying the adhesive of the backed tiles, said heating oven having a separately driven second conveyor means to move the tile boards therethrough independently of the movement of said first conveyor means, and means for turning the sheet-backed boards of tiles through a 90° angle at the end of said first conveyor means to present them to said second conveyor means for passage through said heating oven in a sidewise relation.

3. Tile sheet backing apparatus comprising in combination, continuously moving conveyor means, a plurality of tile holding boards carried by said conveyor means, each tile board having a plurality of partitions defining a plurality of rectangular tile holding pockets, the boards on said conveyor means having tiles in the pockets in random arrangement, and means located along said conveyor means for rearranging the tiles in the board pockets in a precise uniform position in preparation for the application of a backing sheet to the tiles, said tile rearranging means including a positioning mechanism for tilting a board about two axes with one corner low and a diagonal corner high whereby tiles which move into the lower corners of the pockets remain in that position by gravity while a backing sheet is being applied.

4. Tile backing apparatus as claimed in claim 3 wherein said positioning mechanism comprises supports of unequal height on said conveyor means for supporting boards in a tilted position.

5. Tile sheet backing apparatus as set forth in claim 3 wherein said tile rearranging means also includes means for rapping a tilted board to influence the tiles to move down into the lower corners of the pockets.

6. Tile sheet backing apparatus as claimed in claim 4 wherein said tile rearranging means also includes means for rapping tilted boards as they arrive at a given location, said latter means being adapted to follow and to continue to rap said boards for a predetermined distance.

7. Tile sheet backing apparatus as set forth in claim 4, in which said tile rearranging means also includes means for rapping tilted boards as they arrive in a given location and for following them for a distance while continuing to rap them.

8. Tile sheet backing apparatus as set forth in claim 4, in which said tile rearranging means also includes means for rapping tilted boards as they arrive in a given location and for following them for a distance while continuing to rap them, said rapping means including a swingable rapping arm having a cam follower thereon, and a continuously rotating ratchet cam timed with the movement of the board conveyor means to operate said cam follower and rapping arm, said ratchet cam having a plurality of radial drops and cam risers of decreasing radial height to cause said rapper arm to follow a board and rap it successively, and said ratchet cam having a high-rise cam portion and a high concentric portion to hold said rapper arm out of action and clear for the passage of boards until in position for rapping.

9. Tile sheet backing apparatus, comprising in combination, a board forwarding first conveyor having spaced chains which support rectangular boards having tile pockets thereon charged with tiles and move the boards endwise and spaced apart continuously at uniform speed, a double-tilt second conveyor having support means thereon for holding a board in double-tilted position and moving them forward endwise and spaced apart continuously with one corner disposed lowermost, said second conveyor having an inclined span which rises beneath a horizontal end portion of the first conveyor for causing the board support means thereon to rise beneath boards on said first conveyor and lift them off the first conveyor as the first and second conveyors move forward together in their overlapping portions.

10. Tile sheet backing apparatus, comprising in combination, a double-tilt tile board conveyor which moves tile boards along in spaced relationship with one lowermost, a side-tilt tile board conveyor having an overlapping portion with said double-tilt conveyor for taking boards therefrom, the inclination of the boards on the side-tilt conveyor being approximately the same as the angle of side tilt of boards on said double-tilt conveyor.

11. Tile sheet backing apparatus as set forth in claim 10, wherein said double-tilt conveyor comprises separate longitudinally spaced board-supporting chains of different height leaving open space therebetween, and said doublt-tilt conveyor having a descending span in the overlap with side-tilt conveyor for transferring boards to said side-tilt conveyor as both conveyors move along together.

12. Tile sheet backing apparatus comprising in combination, a side-tilt conveyor which moves tile boards along with one side lowermost, turntable means located along said conveyor and having a horizontal board supporting plate which is normally located below the bottom portion of boards moved thereover, means for supporting said plate to first raise it, then turn it, and then lower it, and a high-level wide gage conveyor having a portion overlapping the portion of the side-tilt conveyor where said turntable is located, said turntable plate when raised engaging a lower portion of a tilted board and moving upward until the board is fully supported on the plate.

13. Tile sheet backing apparatus as set forth in claim 12, wherein said conveyors each comprises laterally spaced unconnected chains which continuously travel along and leave open space at all times for said turntable means.

References Cited by the Examiner

UNITED STATES PATENTS

| | | | |
|---|---|---|---|
| 1,724,764 | 8/1929 | Jones et al. | 156—561 |
| 2,709,864 | 6/1955 | Gulbrandsen | 29—211 |
| 2,852,932 | 9/1958 | Cable | 29—211 |
| 3,033,739 | 5/1962 | Klein | 156—561 |

EARL M. BERGERT, *Primary Examiner.*

M. L. KATZ, *Assistant Examiner.*